(12) United States Patent
Peckolt et al.

(10) Patent No.: US 12,305,729 B2
(45) Date of Patent: May 20, 2025

(54) ARRANGEMENT FOR TRANSFERRING TORSION TORQUE, PARTICULARLY IN THE FORM OF A TORSION SPRING OR DRIVE SHAFT MADE OF COMPOSITE FIBER MATERIALS IN ORDER TO ACHIEVE A HIGH SPECIFIC MATERIAL USAGE

(71) Applicant: NEMOS GMBH, Duisburg (DE)

(72) Inventors: Jan Peckolt, Duisburg (DE); Roland Vilsmeier, Duisburg (DE); Jan Puetz, Duisburg (DE)

(73) Assignee: NEMOS GMBH, Duisburg (DE)

( * ) Notice: Subject to any disclaimer, the term of this patent is extended or adjusted under 35 U.S.C. 154(b) by 902 days.

(21) Appl. No.: 17/253,949

(22) PCT Filed: Jun. 18, 2019

(86) PCT No.: PCT/EP2019/066068
§ 371 (c)(1),
(2) Date: Dec. 18, 2020

(87) PCT Pub. No.: WO2019/243354
PCT Pub. Date: Dec. 26, 2019

(65) Prior Publication Data
US 2021/0317890 A1    Oct. 14, 2021

(30) Foreign Application Priority Data

Jun. 18, 2018 (DE) ..................... 10 2018 114 583.7
Apr. 16, 2019 (DE) ..................... 20 2019 102 181.0

(51) Int. Cl.
*F16F 1/48* (2006.01)
*B32B 1/08* (2006.01)
(Continued)

(52) U.S. Cl.
CPC ............... *F16F 1/48* (2013.01); *B32B 1/08* (2013.01); *B32B 5/12* (2013.01); *B32B 5/145* (2013.01);
(Continued)

(58) Field of Classification Search
CPC ...... E03F 9/005; F16F 1/14; F16F 1/36; F16F 1/3605; F16F 1/366; F16F 1/3665;
(Continued)

(56) References Cited

U.S. PATENT DOCUMENTS 475,384 A * 5/1892 Cockburn ............. F16L 11/082
152/286
2,573,361 A 10/1951 Rodgers, Jr. et al.
(Continued)

FOREIGN PATENT DOCUMENTS

CH         637739 A  *  8/1983  ............ B21F 35/003
CN      105556160 A     5/2016
(Continued)

OTHER PUBLICATIONS

Chinese Office Action for Application No. 2019800404951 dated Jun. 28, 2022 with English Translation.
(Continued)

*Primary Examiner* — Pamela Rodriguez
(74) *Attorney, Agent, or Firm* — Carter, DeLuca & Farrell LLP

(57) ABSTRACT

The invention relates to a torsion carrier, particularly a torsion spring, helical spring, drive shaft or balance shaft, which enables significant material and installation space savings compared to the prior art. The torsion carrier consists of a plurality of, but at least two supporting layers lying radially one above the other, each of which consists of at least one spiral coil (1, 3), but preferably of a plurality of spiral coils made of predominantly unidirectional composite
(Continued)

fiber material, wherein at least two of the supporting layers have a counterrotating spiral coil orientation relative to one other. An elastic intermediate spacer layer (2) is arranged between adjacent spiral coil layers, by means of which a decoupling of the spiral coil expansions of adjacent spiral coil layers is achieved. This achieves particularly favorable, predominantly single-axis states of stress which allow for a high level of material utilization.

20 Claims, 8 Drawing Sheets

(51) Int. Cl.
    *B32B 5/12*       (2006.01)
    *B32B 5/14*       (2006.01)
    *F16C 1/02*       (2006.01)
    *F16F 1/366*     (2006.01)

(52) U.S. Cl.
    CPC .............. *F16C 1/02* (2013.01); *F16F 1/3665* (2013.01); *B32B 2250/03* (2013.01); *B32B 2307/546* (2013.01); *B32B 2597/00* (2013.01); *F16F 2224/0241* (2013.01); *F16F 2238/024* (2013.01)

(58) Field of Classification Search
    CPC ................. F16F 1/48; F16F 2224/0241; F16F 2238/024; B32B 1/08; B32B 5/12; B32B 5/145; B32B 2250/03; B32B 2307/546; B32B 2597/00; F16C 1/02
    See application file for complete search history.

(56) References Cited

U.S. PATENT DOCUMENTS

| | | | | |
|---|---|---|---|---|
| 3,559,693 A | * | 2/1971 | Reynard | F16C 1/20 138/144 |
| 3,628,352 A | * | 12/1971 | Stuemky | F16D 3/74 464/88 |
| 3,690,639 A | * | 9/1972 | Brandon | F16F 1/3842 416/134 A |
| 3,704,877 A | * | 12/1972 | Nunes | B29C 70/20 188/372 |
| 3,784,441 A | * | 1/1974 | Kaempen | B29C 70/207 156/169 |
| 3,788,162 A | * | 1/1974 | Rabenhorst | B32B 5/26 428/64.2 |
| 4,380,483 A | | 4/1983 | Kliger | |
| 4,518,018 A | * | 5/1985 | Kutnyak | F16L 11/12 138/132 |
| 4,765,602 A | * | 8/1988 | Roeseler | F16F 1/3665 267/148 |
| 5,464,197 A | * | 11/1995 | Ecclesfield | F16F 1/041 267/155 |
| 5,884,383 A | * | 3/1999 | Wolfe | F16L 13/103 29/237 |
| 6,382,258 B1 | * | 5/2002 | Tanaka | F16L 11/082 138/144 |
| 6,612,556 B2 | | 9/2003 | Petrina | |
| 6,881,150 B2 | * | 4/2005 | Schwartz | D07B 1/144 464/9 |
| 8,152,578 B2 | | 4/2012 | Rigby et al. | |
| 8,505,888 B2 | | 8/2013 | Whitaker et al. | |
| 8,984,698 B1 | | 3/2015 | Olsson | |
| 10,087,979 B2 | | 10/2018 | Shippy et al. | |
| 10,247,273 B2 | | 4/2019 | Bremmer et al. | |
| 10,323,710 B2 | | 6/2019 | Hufenbach et al. | |
| 10,736,412 B2 | | 8/2020 | Hiltunen | |
| 11,078,979 B2 | | 8/2021 | Kiele et al. | |
| 2002/0007146 A1 | * | 1/2002 | Omaleki | A61M 25/09 604/103.09 |
| 2002/0134451 A1 | * | 9/2002 | Blasko | B32B 1/08 138/140 |
| 2002/0190451 A1 | * | 12/2002 | Sancaktar | B29C 70/542 267/166 |
| 2013/0069273 A1 | * | 3/2013 | Petri | B32B 27/40 264/262 |
| 2014/0251485 A1 | * | 9/2014 | Chen | B32B 37/16 138/137 |
| 2017/0367470 A1 | * | 12/2017 | Hiltunen | A46B 5/0037 |
| 2018/0258979 A1 | * | 9/2018 | Omohundro | F16C 1/08 |
| 2019/0038295 A1 | * | 2/2019 | Omohundro | A61B 17/1631 |
| 2021/0138252 A1 | | 5/2021 | Eby et al. | |

FOREIGN PATENT DOCUMENTS

| | | | |
|---|---|---|---|
| DE | 3824933 A1 | 1/1990 | |
| DE | 29612512 U1 | * 11/1996 | ............ B08B 9/045 |
| DE | 202005016889 U1 | 1/2006 | |
| DE | 10 2013 016 483 A1 | 7/2014 | |
| DE | 10 2010 048 717 B4 | 8/2015 | |
| DE | 20 2015 103 906 U1 | 8/2015 | |
| DE | 10 2015 214 444 A1 | 2/2017 | |
| EP | 0351723 A2 | 1/1990 | |
| EP | 0943827 A2 | 9/1999 | |
| EP | 1568608 B1 | 6/2008 | |
| EP | 3290127 A1 | 3/2018 | |
| FR | 2 901 589 B1 | 5/2012 | |
| GB | 2142944 A | * 1/1985 | ............ E03F 9/005 |
| GB | 2 571 716 A | 9/2019 | |
| JP | S5373731 A | 6/1978 | |
| JP | S59133813 A | 8/1984 | |
| JP | H0949517 A | 2/1997 | |

OTHER PUBLICATIONS

Chinese Search Report for application No. 2019800404951 dated Jun. 22, 2022 with English Translation.
International Search Report for PCT/EP2019/066068 dated Sep. 27, 2019.
Japanese Office Action for application No. 2020-571668 dated May 16, 2023, with English translation.

* cited by examiner

ARRANGEMENT FOR TRANSFERRING TORSION TORQUE, PARTICULARLY IN THE FORM OF A TORSION SPRING OR DRIVE SHAFT MADE OF COMPOSITE FIBER MATERIALS IN ORDER TO ACHIEVE A HIGH SPECIFIC MATERIAL USAGE

BACKGROUND

Torsion-loaded tubes and similar torque-carrying components undergo multi-axial states of stress. The shear stress in an imaginary vertical section through a torsion-loaded tube is converted in accordance with Mohr's circle into two orthogonal main stresses in the directions of +/−45°, per direction under tensile and compressive stress. This state of stress is not a problem for amorphous materials (metals) in terms of their material limits. However, composite fiber materials are particularly sensitive to multi-axial states of stress. In order to carry the main stresses, the laminate layers are preferably laid in the main directions of stress. Classic torsion tubes made of composite fiber materials are therefore constructed from fibers of differing directions of rotation. For example, fibers with a winding direction of +45 degrees carry the tensile stresses and fibers with a winding direction of −45 degrees carry the compressive stresses. The fibers of both directions lie orthogonally with respect to one another here. However, laminate layers not lying parallel to one another may experience unfavorable interactions:

A tensile or compressive loading in a fiber direction leads to a positive or negative longitudinal extension. When directly attached in a continuous laminate structure, this leads to a transverse extension in the other fiber direction in each case. However, composite fiber materials have only a small extensibility transversely with respect to the fiber direction. There are predominantly two reasons for this: the fibers lie at close distances from one another and have a substantially higher degree of rigidity than the surrounding matrix material, as a result of which only a small extension distance is available, and therefore, even in the event of small transverse extensions of the composite, the matrix material overstretches (predominantly relevant in the case of composite materials with amorphous fibers, for example glass fibers), or the fibers themselves because of their anisotropic composition have such a sensitive nature that they are damaged even in the event of small transverse loads (this is relevant for example in the case of carbon fibers).

Even in the event of small transverse extensions, interlaminar cracks are therefore formed, as a result of which the longitudinal load-bearing capability of the composite damaged in this manner is reduced and the component may fail. Compression-loaded regions of the laminate are particularly affected because of their reduced stability.

Repeated load changes lead here to an accelerated propagation of cracks, and therefore, inter alia, high fatigue allowances in the dimensioning are required in order to generally lower the level of extension. This means that a component with a high number of anticipated load cycles has to be realized with significantly more use of material in order to limit the extensions and stresses. This has a greatly negative effect particularly in the case of spring components (torsion springs here) since the elastic energy which can be stored is proportional to the product of stress and extension. Alternatively, because of the linear interrelationship of the two sizes, the energy which can be stored is proportional to the square of the stress or to the square of the extension.

The generally unfavorable material utilization is thus a substantial reason for the previously low prevalence of composite fiber materials in such applications.

A further problem is the failure of composite fiber torsion components due to shear loads. An insufficient deformation capability leads here to interlaminar formation of cracks between parallel fiber strands.

BRIEF DESCRIPTION OF THE DRAWINGS

FIGS. 4a-4d are various views of an embodiment of an intermediate layer of the torsion carrier of FIG. 1 in an unwound state;

FIGS. 5a-5c are various views of another embodiment of an intermediate layer of the torsion carrier of FIG. 1 in an unwound state;

FIGS. 6a-6c are various views of still another embodiment of an intermediate layer of the torsion carrier of FIG. 1 in an unwound state;

FIGS. 7a-7c are various views illustrating layers of another embodiment of a torsion carrier in an unwound state in accordance with the principles of this disclosure;

FIGS. 8a-8c are various views illustrating layers of still another embodiment of a torsion carrier in an unwound state in accordance with the principles of this disclosure;

DETAILED DESCRIPTION

While torsion carriers having conventional laminate structures withstand only relatively small stress levels because of the abovementioned sensitivity in relation to multi-axial states of stress (a fiber-parallel stress of up to approximately 300 MPa in the case of GFRP), with the solution approach described below significantly higher stresses (up to approximately 600 MPa in the case of GFRP) have been able to be achieved. The doubling of the stress level has the result that it is possible to realize torsion-transferring components with approximately half the use of material torsion springs with approximately ¼ of the use of material because of an extension approximately parallel to the stress.

In addition to advantages in terms of weight and costs, the proposed concept can also permit considerable savings in respect of the required construction space.

A structure is proposed having separate layers of individual spiral coils which have an opposed (winding) direction of rotation of the fibers. Spiral coils are understood as meaning helical strips of limited width that are coiled around the longitudinal axis of the component helically at a certain pitch angle on a cylindrical circumferential surface. The opposed coils are mutually supported radially under loading, wherein the torsion loading is converted into tensile load(s) in the outer spiral coil(s) (1) and compressive load(s) in the inner spiral coil(s) (3). The spiral coils of a (radial) layer plane are intended to be able to change their distance with respect to one another according to the form of loading, as a result of which an extension transversely with respect to the longitudinal direction of the spiral coils is made possible. In addition, the compensating gap which is provided assists shear deformations between the adjacent parallel spiral coils of a layer.

The proposed structure means that the spiral coils are intended to undergo uniaxial states of stress as far as possible, with predominantly tensile or compressive loads in the longitudinal direction, as a result of which said spiral coils can be constructed predominantly from unidirectional laminates (fibers in the longitudinal direction of the spiral coils) or by means of slightly twisted composite fiber material (with a mean fiber orientation in the longitudinal direction of the spiral coils). In an advantageous embodiment, the fibers deviate from the longitudinal direction of the spiral coils by below 10 degrees, furthermore preferably by below 5 degrees.

Figure 1:
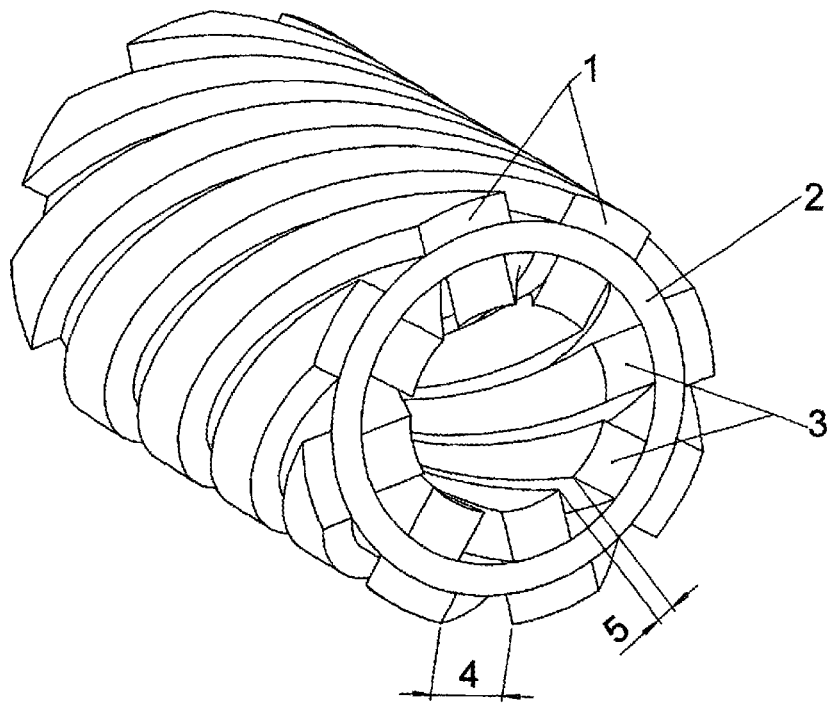
FIG. 1 is a perspective view of a torsion carrier in accordance with principles of this disclosure.
Figure 2A:
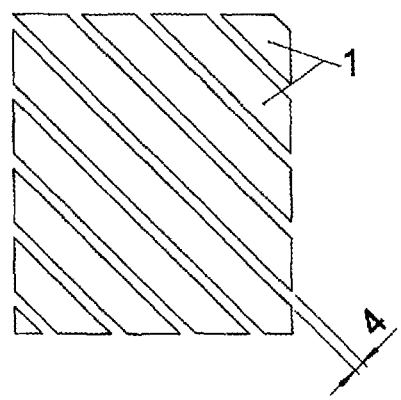
FIGS. 2a-2c are various views of an embodiment of external spiral coil layer of the torsion carrier of FIG. 1 in an unwound state.
Figure 2C:
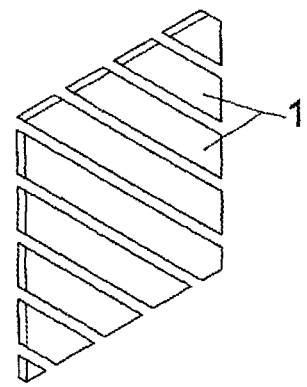
Figure 2B:
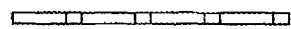
Figure 3A:
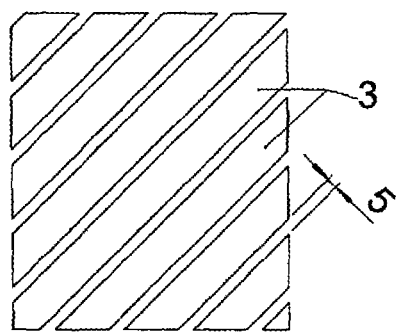
FIGS. 3a-3c are various views of an embodiment of internal spiral coil layer of the torsion carrier of FIG. 1 in an unwound state.
Figure 3C:
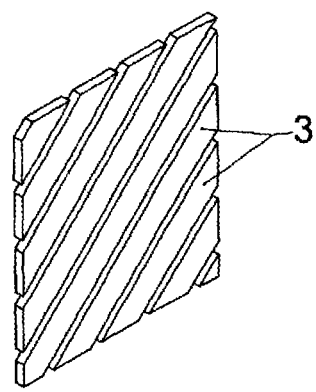
Figure 3B:
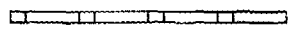
Figure 4A:
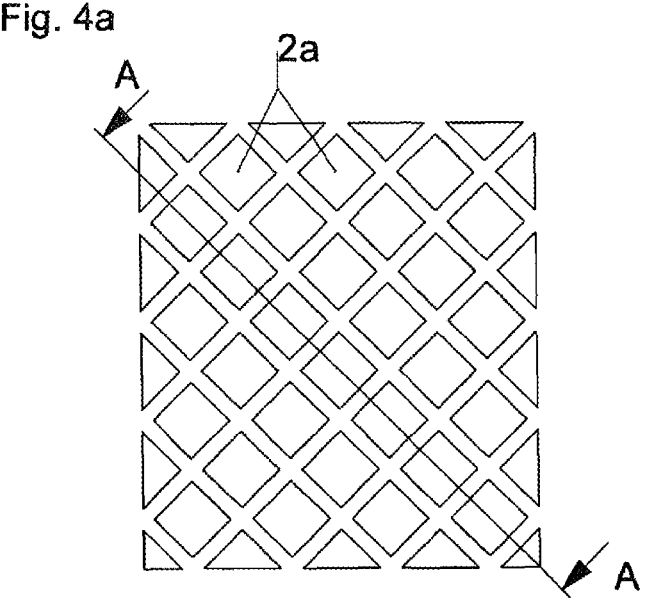
Figure 4B:
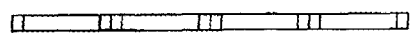
Figure 4B:
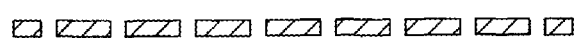
Figure 4D:
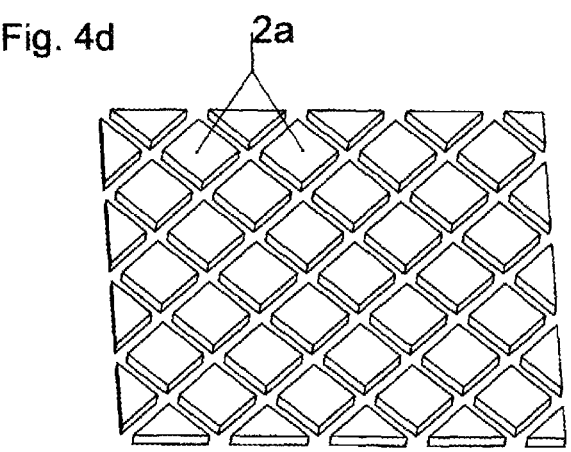
Figure 9:
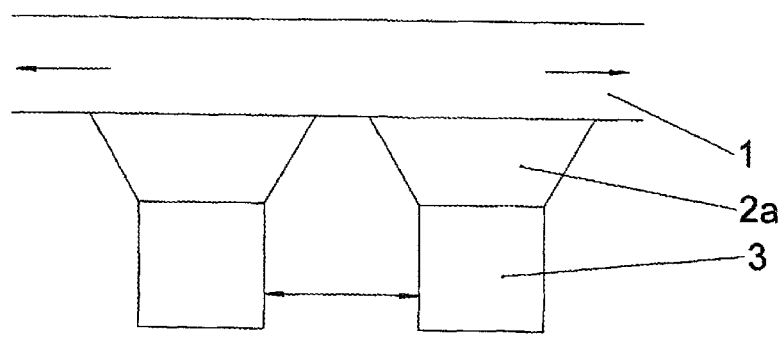
FIG. 9 is a side view illustrating layers of yet another embodiment of a torsion carrier in an unwound state in accordance with the principles of this disclosure.

So that the longitudinal extension of the spiral coils of a layer is not directly impressed onto the spiral coils of an adjacent layer lying transversely with respect thereto and instead the compensation of the transverse extension takes place primarily in the gaps provided for this purpose between the spiral coils, it is advantageous if the layers are decoupled from one another by means of a compensating zone which is called "intermediate layer" below. The effect of the decoupling of the transverse extension is illustrated by way of example in FIG. 9. An external spiral coil 1 extended by a tensile load is shown by way of example. An intermediate layer 2a and an internal spiral coil 3 adjoin on the inside. The intermediate layer 2a shown here by way of example in a variant embodiment "a" undergoes an extension by connection to the external spiral coil 1. The deformation capability of said intermediate layer means that the extension is not impressed (or only to a small extent) onto the compression-loaded internal spiral coils 3. Instead of producing an interfering transverse extension within the internal spiral coils 3, the extension leads only to an increase in the size of the gap 5 between two adjacent internal spiral coils 3, as a result of which the distance between the two illustrated adjacent internal spiral coils 3 is increased (cf. FIG. 1).

The corresponding effect is also achieved in an analogous manner for compressive loads in the internal spiral coils 3. In this case, the intermediate layer 2 and the compensating gap 4 also permit a shortening of the internal spiral coils due to compressive loads to lead to a reduction in size of the gap (4) between the external spiral coils 1 and thus to the external spiral coils 1 being protected against undesired transverse compressions.

Figure 10:
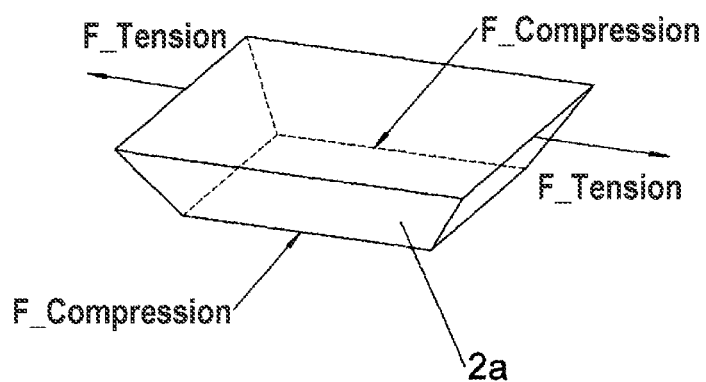
FIG. 10 is a schematic view illustrating forces acting on the intermediate layer shown in FIGS. 4a-4d.

The volume elements of the intermediate layer 2a, which volume elements can be considered by way of example as cuboid support elements between the intersecting spiral coils, because of a simultaneous compression of the adjacent internal spiral coils 3 as a result of the compressive force (F Compression) and lengthening of the external spiral coils 1 as a result of the tensile force (F Tension) undergo a deformation to form a truncated pyramid, see FIG. 10. This deformation capability ensures that the longitudinal extension of the fibers of a layer is not transferred to the composite fiber material of the spiral coils of the adjacent layer, which may be referred to as decoupling of the transverse extension.

Delimitation Over the Prior Art

Geometrically similar arrangements as in the present invention can be found in the prior art particularly in the context of flexible drive shafts. However, these inventions pursue a different objective and accordingly differ in substantial device features. For example, U.S. Pat. No. 8,984, 698 describes metallic spiral coils instead of composite fiber spiral coils. Or, in the case of the arrangement which is known from US 2018/0258979 and which likewise has great geometrical similarity, an elastic intermediate layer is not provided. Since the latter has been able to be established (simulatively) as an important element or a prerequisite for the decoupling of composite fiber spiral coils and the associated uniaxial states of stress, the described improvement in the degree of material utilization has been demonstrated (in experimental investigations).

Implementation Features

The coils of a layer plane can be designed in single or multiple form. In multiple form means that a plurality of spiral coils are contained per layer. In the case of a tubular component, said spiral coils are wound parallel to one another at the same pitch around the longitudinal axis of the tube, wherein the spiral coils of a layer are at the same radial distance from the central longitudinal axis of the tube. In a favorable embodiment, more than three spiral coils, furthermore preferably more than six spiral coils, furthermore preferably more than 10 spiral coils are used per layer.

The angles of the spiral coils, i.e. the pitch of the convolutions thereof, can be selected in accordance with the requirements of an application and thus influence the rigidity of the component. With respect to the longitudinal direction of the component (tube), angles in the range of approximately 10 degrees to 85 degrees or in the opposite layer of −85 degrees to −10 degrees are technically expedient. A favorable embodiment has (direction of rotation) angles of approximately 45 degrees and −45 degrees for both winding directions. In order to produce equilibriums of forces, a deviation can in each case be made from said +/−45 degree arrangement by single-digit degree numbers, thus resulting, for example, in arrangements with +40 degrees and −50 degrees.

Torsion elements which include a greater number of layers, i.e. more than two layers, are also proposed, as a variant embodiment of this invention. They can contain a plurality of pairings of tension and compression layers which are each decoupled by means of intermediate layers. By this means, the radial pressure between the individual layers is reduced, and therefore softer materials can be used and the entire component can be subjected even to loads in the reverse direction of rotation of the torque. When the direction of the torque is reversed, the previously described external spiral coils are subjected to compressive loads (instead of tensile loads as in the previously described basic form of loading) and the internal spiral coils are subjected to tensile loads (instead of compressive loads as in the previously described basic form of loading). In this case, tensile loads (instead of compressive loads as in the previously described basic form of loading) occur between the layers and have to be transmitted via the intermediate layer. In addition to the described variant with two load-bearing layers (a tensile layer and a compressive layer), variants having 3, 4, 5, 6 or a greater number of layers are also advantageous.

It should be mentioned that, within the context of the present invention, the term "internal spiral coils" relates to spiral coils which are subjected to compressive forces when the component is loaded in its preferred direction. By contrast, the term external spiral coils relates to spiral coils which are subjected to tensile loads when the component is loaded in its preferred direction. In cases in which the described torsion carriers are constructed in the radial direction from more than two layers of spiral coils, the terms "on the inside" and "on the outside" refer to the relative arrangement of a pairing of two layers with respect to one another that are mutually supported in the radial direction.

The result of the described construction for decoupling the spiral coils of adjacent layers from one another and for decoupling the spiral coils within a layer is that the stresses in the spiral coils predominantly run in the fiber direction and interfering transverse extensions are suppressed (or at least reduced). A high utilization of the composite fiber material can thus be achieved, and therefore higher deformation capabilities and stresses can be permitted, as a result of which the components can be realized with a smaller construction space and lower use of material than conventional systems. With the given structure, a particularly high specific extension energy can be stored in a torsion spring.

The invention provides a plurality of variant embodiments for the intermediate layer (2):

The intermediate layer can be realized by an elastic material, as a result of which it ensures spacing of adjacent layers of opposed load-bearing spiral coils and its deformation capability enables decoupling of the layers, as a result of which a longitudinal extension of the spiral coils of one layer leads only slightly to a transverse extension of the spiral coils of the adjacent layer. In an advantageous embodiment, the intermediate layer is connected to the load-bearing spiral coils, in particular is connected in an integrally bonded manner. This can be of fundamental importance since in particular the compression-loaded spiral coils thereby undergo fixing and their free buckling length (in respect of a failure of stability) is significantly reduced.

For an integrally bonded attachment, use can be made of special adhesion promoters permitting a particularly good connection between composite fiber material and elastic intermediate layer. Or an intermediate layer material can be used which is connected particularly readily to the composite fiber material, in particular an elastomer which cures or crosslinks together with the synthetic resin of the composite fiber material.

In order to obtain a high deformation capability to compensate between load-bearing layers (or between the external spiral coils (1) and the internal spiral coils (3)) and at the same time to ensure a high load-bearing capability against radial pressure between the layers or in order to limit energetic losses (dissipative damping effects), use can be made of a relatively hard material which obtains the required deformation capability simply by appropriate shaping. In the context of the present invention, this second variant of the intermediate layer (with a specially shaped, relatively hard material) will also be referred to as "elastic intermediate layer". For this purpose, FIGS. 4a to 4d illustrate an arrangement, wherein the intermediate layer is constructed in the form of individual rhombuses which are present only in the regions in which spiral coils intersect. In regions in which there is a gap (4 and 5) between the spiral coils in one of the load-bearing layers, the intermediate layer is also interrupted. The elastic intermediate layer here thus has gaps which are designed as a radial continuation of the compensating gaps between the spiral coils of a layer and either partially or completely interrupt the intermediate layer.

Figure 5A:
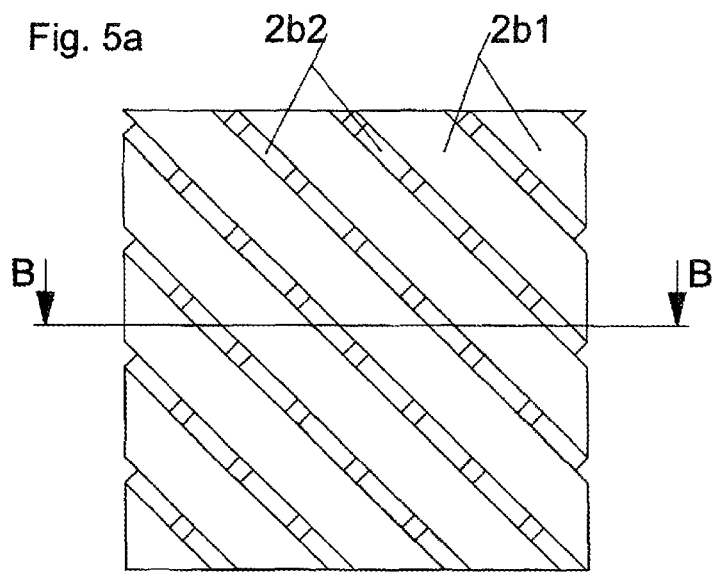
Figure 5C:
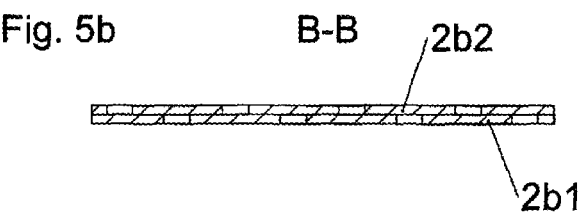
Figure 5C:
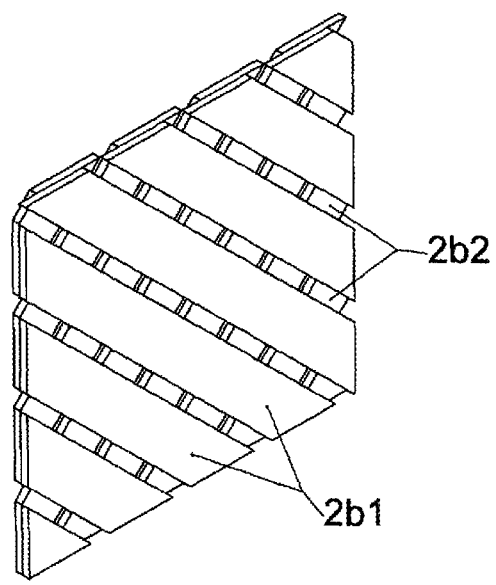

In respect of the manufacturing, said shaping can be produced prior to the connection of the two load-bearing layers, or the material can be removed from the intermediate layer by material abrasion through the gaps between the spiral coils (abrasion by cutting or by laser abrasion or by cutting with a water jet), in order to produce the surface interruptions. Alternatively, FIGS. 5a to 5c present an arrangement in which the intermediate layer is constructed from two layers (2b1) and (2b2). Said layers are each arranged along the external spiral coil (1) and internal spiral coil (3) and are thus extensively connected. Along the gaps between the spiral coils, the intermediate layer thus has gaps which are formed approximately up to half the layer thickness. Said layers are each manufactured together with the spiral coils, or the gaps can be produced from a flat intermediate layer by retrospective partial abrasion in the region of the gaps of the external and internal spiral coils. Said partial abrasion can take place, for example, to half the layer thickness, or a rounded groove (score) can be worked out of the intermediate layer.

Figure 6A:
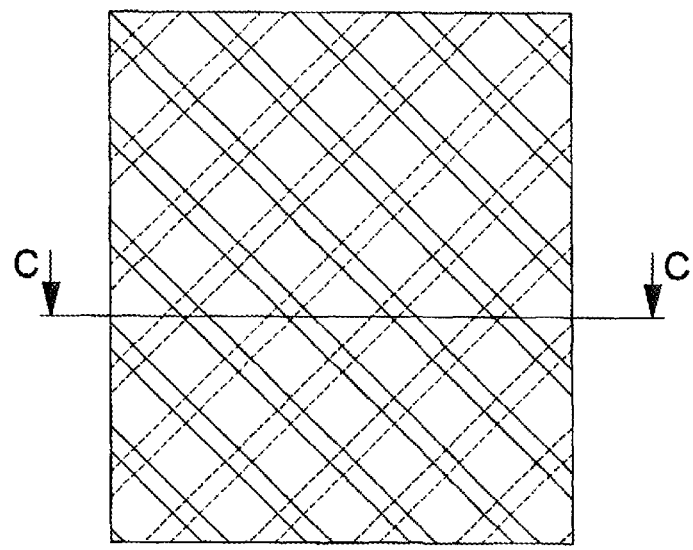
Figure 6A:
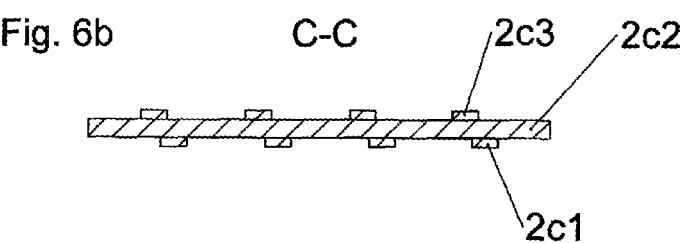
Figure 6C:
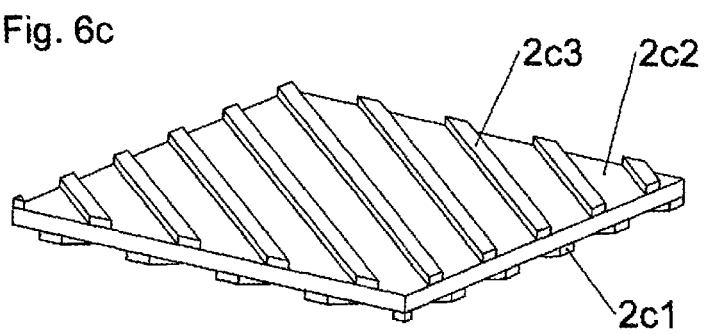
Figure 7A:
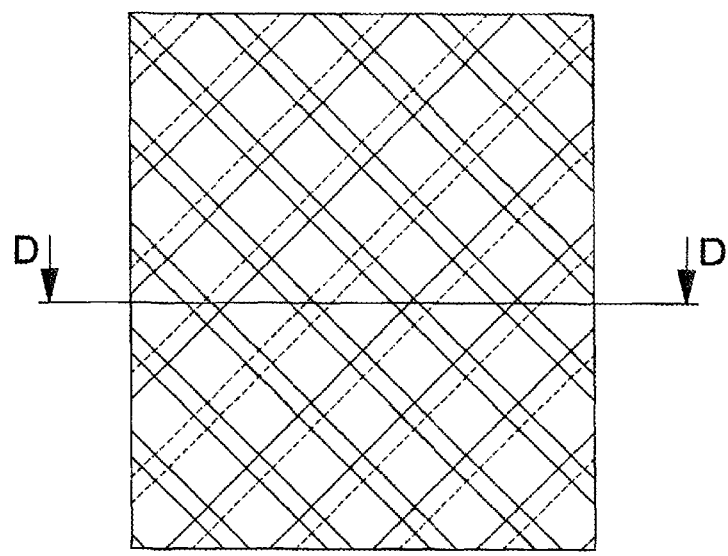
Figure 7A:
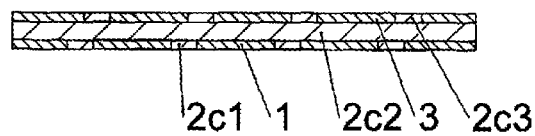
Figure 7C:
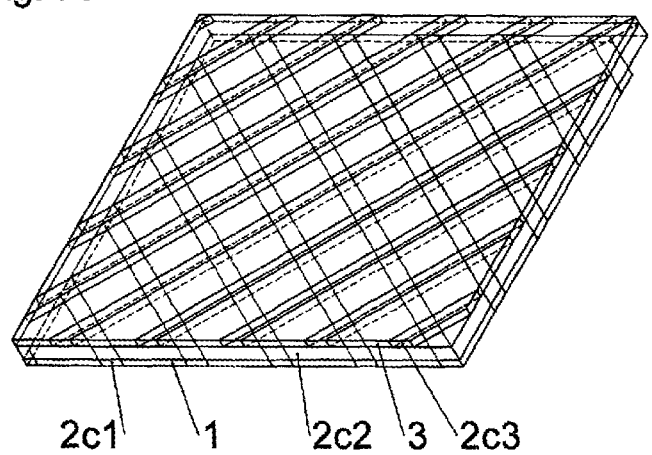

A further embodiment is possible with the use of relatively soft materials, such as, for example, polyurethane or rubber. In this case, the intermediate layer is designed as a filled volume (without grooves). The required deformations (predominantly shear deformations for decoupling the layers) take place here by the deformation capability of the soft material. An advantageous variant thereof is an arrangement in which the material of the intermediate layer is prevented from being squeezed out through the spiral coil compensating gaps. By this means, the deformation of the intermediate layer material is limited and the pressure between the external spiral coils and internal spiral coils is partially converted into a (hydrostatic) pressure on all sides which is permissible to a relatively high degree even in the case of soft materials. FIGS. 6a to 6c illustrate this geometrical variant of the intermediate layer (2c). The continuous layer (2c2) is adjacent here to the filling of the compensating gaps of the external spiral coils (2c1) and the filling of the compensating gaps of the internal spiral coils (2c3). The fillings of the compensating gaps (2c1 and 2c3) can be realized here from the same material as the surface of the intermediate layer (2c2) or from a different material. A significantly softer material is advantageous here. FIGS. 7a to 7c illustrate this variant of the intermediate layer (with the elements 2c1, 2c2, 2c3) for illustrative purposes in combination with the associated spiral coils (1) and (3).

A further embodiment is a structuring of the intermediate layer for an improved extension behavior.

Figure 11:
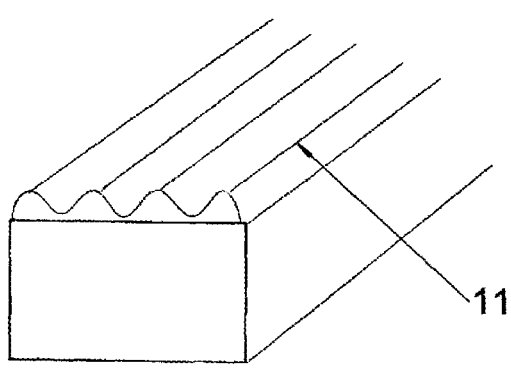
FIG. 11 is an enlarged perspective view of a portion of still another embodiment of an intermediate layer in an unwound state in accordance with the principles of this disclosure.

As illustrated in FIG. 11, the surface of the intermediate layer upon contact thereof with a spiral coil can have scores or lamellae which lie transversely with respect to the fiber direction or longitudinal extent of the spiral coil. An extension of the respective spiral coil is thus converted into an angular change or tilting of the scores or lamellae, as a result of which the decoupling properties are improved. Over and beyond the illustrated arrangement, this can take place in each case on both sides of the intermediate layer (wherein the scores or lamellae of the two sides are at an angle to one another at which the spiral coils of the two layers to be decoupled are also at with respect to one another).

Figure 8A:
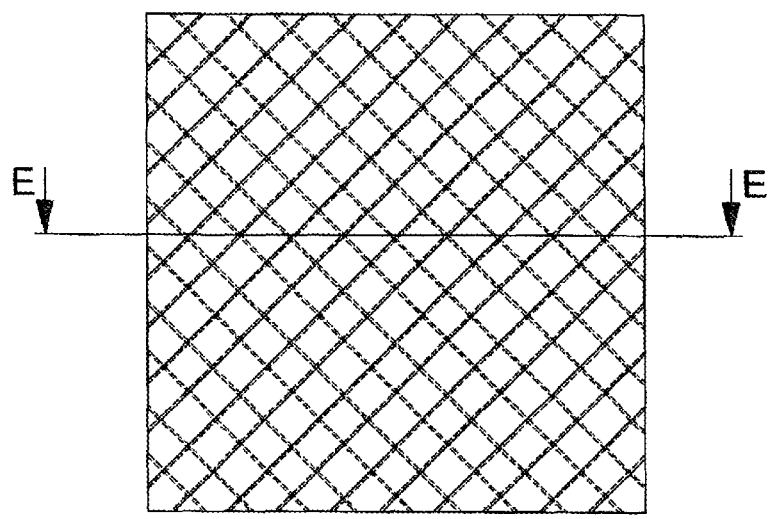
Figure 8A:
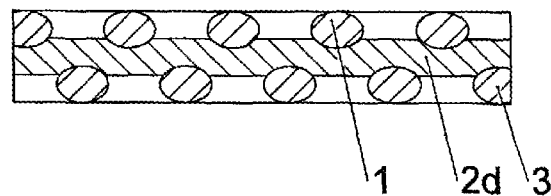
Figure 8C:
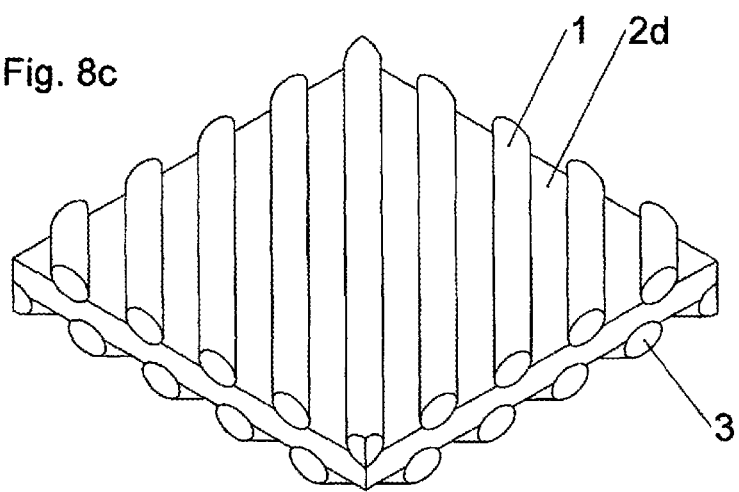

According to the invention, in general various variant embodiments are also provided for the compensating gaps between the spiral coils. The gaps can be filled either with an elastic material (such as, for example, polyurethane, silicone, rubber, a foam or an epoxy resin), thus promoting the above-described effect of the hydrostatic pressure. Or the gaps can be left without a filling (as a result of which they contain the ambient medium, such as, for example, air), and therefore their deformation capability is unlimited. Intermediate variants, such as a partial filling (2d), are also possible, see FIGS. 8a to 8c. According to the invention, variants are likewise provided in which yielding of the material is promoted by targeted holes or air pockets (for example by means of a compressible foam), and the deformation properties in this region are positively influenced.

For the profile of the spiral coils, or the cross-sectional geometry thereof, there are various embodiment options. In addition to rectangular spiral coils, use can be made of round spiral coils (cylinders), semi-cylindrical, oval (see FIGS. 8a to 8c) or else substantially rectangular shapes with individual rounded sides. In particular, a rectangular profile with a rounded side surface that is in contact with the intermediate layer is considered advantageous within the context of the invention since the shear deformations occurring in the intermediate layer are thereby reduced.

As an advantageous variant embodiment of the spiral coils themselves, the surface of the latter, in particular of the compression-loaded spiral coils, can at least partially contain fibers which are tension-relieving with respect to an elastic intermediate layer and have an orientation transversely with respect to the longitudinal direction of the spiral coils. Said fibers can carry a substantial portion of the transverse stresses induced via the intermediate layer. As a result, the transverse stresses or the transverse extensions in the load-bearing material of the spiral coils (in the fibers in the longitudinal direction of the spiral coils) turn out to be lower under loading, and therefore the spiral coils can withstand higher loads in the longitudinal direction of the spiral coils, in particular also cyclic loads.

For a final attachment of the spiral coils in a manner appropriate to the load and deformation, the ends of said spiral coils can have an increased layer thickness, the ends of the component can have an increased tube diameter and/or there can be a changed orientation of the spiral coils at the end of the component. By this means, in the event of loading of the component in said regions, a smaller longitudinal stress occurs in the spiral coils, and therefore additional stresses from bending of the spiral coils can be absorbed.

Similarly, additional end pieces can be attached to the ends of the spiral coils (for example by means of adhesive connections), the end pieces permitting a harmonious bending of the spiral coils and a transfer of the forces in the longitudinal direction of the spiral coils to an adjacent component, or an articulated attachment of the spiral coils to a component end piece.

In a further advantageous variant embodiment, the bending zone at the end of the spiral coils can be realized with a narrowing of the spiral coils, as a result of which the deformation capability in the event of a change in the pitch of the spiral coils under loading is improved and the additional bending stresses which occur turn out to be smaller than in the case of a spiral coil of full width. In this case, the geometrical moment of inertia relevant for the bending of the spiral coils in the circumferential plane is reduced.

In addition to the illustrated structure having in each case two layers of opposed spiral coils, constructions having three or more layers of different spiral coil orientations are also provided. For example, for improving the flexural rigidity of the overall component, in addition to the two described torsion-carrying layers of spiral coils of approximately +/−45 degrees, a third layer can be contained with fibers in the longitudinal direction of the tube and optionally also with spiral coils and gaps in the longitudinal direction of the tube. These can likewise be decoupled from the adjacent layers by means of an elastic intermediate layer in order to reduce the effects of transverse extensions in the radial direction.

In an advantageous variant embodiment, the interior of the tube constructed from spiral coils can contain a tube or a core of flat material or solid material, in particular with fibers in the longitudinal direction of the tube or fibers at approximately a winding direction of 45 degrees with respect to the longitudinal direction of the tube. The core leads here to an increased load-bearing capability and/or rigidity against transverse force, bending torques or radial loads. At the same time, it has a sufficient deformation capability in the torsion direction because of its small outside diameter (in relation to the overall component). In order to locally increase the load-bearing capability of the component against bending torques to a particular degree, the described core can furthermore be expanded conically locally (in particular at the ends of the component). In an advantageous embodiment, the core is decoupled from the radially outer layers of spiral coils by means of an elastic intermediate layer.

In respect of the outer form, the described torsion carrier (also referred to as "the component") can be designed in the form of a tube or as a rectilinear or bent round bar. In an advantageous embodiment, the component inside diameter and/or outside diameter can be expanded in a funnel-shaped manner in the region of the ends of the tube or bar. Said expansion can lead into a flat or conical flange or into a coupling piece for connection to adjacent components. When the diameter is expanded, the spiral coils at the ends of the component can emerge radially into said flat or conical flange. In an advantageous embodiment, the forces can be introduced here into the spiral coils by means of an integrally bonded connection, frictional connection or form-fitting connection.

In a further advantageous variant embodiment, the torsion carrier in the form of a tube or bar can have a bent shape. It can have, for example, the outer form of a screw or of a helical spring. The tube or the bar can be curved here about one or more axes. Similarly, in addition to a curvature, it can be twisted about the tube longitudinal axis.

At its ends, the helical component can have a reduced screw diameter and/or a changed screw thread height.

In the form of a helical spring which can be loaded in tension or compression, the bent tube or the bent bar is predominantly subjected to torsion section loads. In this case, the structure described according to the invention having opposed spiral coils which are decoupled from one another has been shown to be particularly capable of bearing loads. The predominantly uniaxial state of stress in the composite fiber spiral coils permits a higher utilization of the composite fiber material with significantly higher permissible stress and extension values. The torsion carrier (in the form of a helical spring) thus withstands greater loads and amplitudes. Or, conversely, with a predetermined level of load and movement amplitude, said torsion carrier can be realized with a significantly lower use of material. This applies particularly for cyclic loading forms.

On the basis of the described torsion carrier structure, different devices having different application-specific constructional forms can be realized. These include in particular a torsion tube spring, a torsion bar, a helical spring, a drive shaft, a flexurally elastic torsion shaft or a compensating shaft (or elastic coupling) with angular and offset tolerances.

With regard to claim 3, it is noted that the latter describes an arrangement in multiple form, wherein a plurality of spiral coils are in each case distributed over the circumference and preferably run parallel to one another in an axial direction of the torsion carrier. A multiple form of at least 3 is preferably provided, furthermore preferably a multiple form of at least 6, and therefore a layer contains at least three spiral coils, furthermore preferably at least six spiral coils. For most technical applications, an arrangement of in each case more than 10 spiral coils distributed over the circumference has proven advantageous.

The ratio between the height of the spiral coils (as viewed in the radial direction) and the width of the spiral coils is preferably between 1:1 and 1:3.

As examples of damping materials as per claim 5, reference is made in particular to rubber or polyurethane and other materials having similar elastic properties and damping properties.

Of the layers mentioned in claim 10, in particular 2, 3, 4, 5, 6, 7 or 8 layers are provided.

At least one of the layers mentioned in claim 11 preferably contains spiral coils and gaps in the component longitudinal direction, leading to an increased flexural rigidity or flexural load-bearing capability.

The core discussed in claim 12 is formed in particular from a solid cylindrical element (solid bar) and/or from a hollow cylindrical tube, wherein both can be constructed in particular from composite fiber materials. Alternatively or in addition thereto, the core preferably has fibers with an orientation in the tube longitudinal direction and/or fibers with a 45 degree orientation (optionally with a tolerance of +/−15 degrees).

Cylindrical in claim 13 means in particular that the torsion carrier is designed in the form of a tube or of a rectilinear round bar.

With regard to a diameter changing, according to claim 13, in the direction of the component ends, in an advantageous embodiment an inside diameter expanding outwards in the form of a funnel can be formed. For example, the component ends can thus lead into a flat or conically formed flange or in a coupling contour for connection to adjacent components. Adjacent components mean in particular components which are intended to be coupled to the torsion carrier for rotation therewith. The inside diameter is preferably predetermined here by the internal contour of an internal spiral coil and/or by an internal layer adjoining the inner side.

Definitions and Explanations

Spiral coil The spiral coil, also called helix, screw, helical curve, cylindrical spiral, is a curve which winds with a constant pitch around the casing of a cylinder. It arises from a surface (=layer, plane) which is curved on a radius and has helical slots.

Layer Tubular layer of the component (on a cylindrical circumferential surface) with a defined function. This can either be an intermediate layer or a layer with what are referred to as load-bearing spiral coils (external or internal spiral coils for transferring tensile and compressive stresses).

Form Design of a layer as a spiral coil with gaps.

Intermediate layer Layer for decoupling extensions between two adjacent load-bearing layers (decoupling layer between tension-transferring external spiral coils and compression-transferring internal spiral coils).

Hollow cylinder Hollow circular cylinder.

Compensating gap Gap between the spiral coils of a layer, the gap permitting in particular extension between the spiral coils. In this context, the terminology of a "slotted" arrangement can also be used, wherein spiral coils and compensating gaps arise from a closed layer. The compensating gaps can be filled or unfilled.

Transverse extension Extension transversely with respect to the fiber direction, the extension because of the shortened extension distance of the matrix having significant effects on the load-bearing capability of composite fiber materials, in particular under repeated loadings (fatigue).

Directions The main direction of extent of the spiral coils should be understood as meaning in particular the spiral coil longitudinal direction, i.e. the direction of the greatest longitudinal extent of a spiral coil that preferably extends on a helical curve around an (optionally only virtual) cylinder circumferential surface.

The spiral coil width is understood as meaning the direction which is located in the casing plane and is orthogonal to the main direction of extent.

The extent in the third dimension of the spiral coils is referred to as the height or thickness of the spiral coils. In the case of a tube or bar, this corresponds to the extent in the radial direction.

Supplementary References to the Figures

Drawings 2 to 8 illustrate the layers of the component in the unwound state for reasons of better clarity.

The features of the invention that are disclosed in the present description, in the drawings and in the claims may be essential both individually and in any desired combinations for realizing the invention in its various embodiments. The invention is not restricted to the embodiments described. It can be varied within the scope of the claims and taking into consideration the knowledge of a relevant person skilled in the art.

LIST OF REFERENCE SIGNS

1 External spiral coil
2 Intermediate layer
3 Internal spiral coil
4 Compensating gap between external spiral coils
5 Compensating gap between internal spiral coils
2*a* Intermediate layer in the region of intersection of spiral coils of adjacent layers
2*b*1 Part of the intermediate layer with contact with the external spiral coils
2*b*2 Part of the intermediate layer with contact with the internal spiral coils
2*c*1 Filling of the compensating gap of the external spiral coils
2*c*2 Flat intermediate layer
2*c*3 Filling of the compensating gap of the internal spiral coils
2*d* Intermediate layer between oval spiral coils, the intermediate layer not projecting or projecting partially or completely into the gaps between the spiral coils
11 Structured intermediate layer for improving the deformation capability

What is claimed is:

1. A torsion carrier having at least two layers, each layer of the at least two layers including at least one spiral coil made of composite fiber material, wherein the at least two layers have a mutually opposed spiral coil direction of rotation and at least one spacing elastic intermediate layer arranged between the at least two layers, wherein at least one layer of the at least two layers includes at least two discrete spiral coils separated by a gap and disposed in parallel relationship, wherein the at least one spiral coil of a first layer of the at least two layers has a first surface in contact with the elastic intermediate layer and the at least one spiral coil of a second layer of the at least two layers has a second surface in contact with the elastic intermediate layer, and wherein the first surface and the second surface are disposed in parallel relationship with one another.

2. The torsion carrier as claimed in claim 1, wherein main fiber directions of the composite fiber material of the spiral coils are oriented along a main direction of extent of the spiral coils.

3. The torsion carrier as claimed in claim 1, wherein gaps are at least partially provided between adjacent spiral coils of at least one layer of the at least two layers, and/or a filling of elastic filling material is at least partially arranged between adjacent spiral coils of at least one layer of the at least two layers, and/or the at least one spacing elastic intermediate layer at least partially extends into a region between adjacent spiral coils of at least one layer of the at least two layers.

4. The torsion carrier as claimed in claim 1, wherein the at least one spacing elastic intermediate layer between spiral coils of at least one layer of the at least two layers contain cavities and/or incisions and/or holes and/or are at least partially formed from a foamed material and/or from a damping material.

5. The torsion carrier as claimed in claim 1, wherein a surface of the spiral coils oriented toward the at least one spacing elastic intermediate layer has tension-relieving fibers with an orientation transverse to a main direction of extent of the spiral coils.

6. The torsion carrier as claimed in claim 1, wherein ends of the torsion carrier have an inside and/or outside diameter increasing in a funnel-shaped manner, and/or the spiral coils have a changed pitch in a region of the ends of the torsion carrier.

7. The torsion carrier as claimed in claim 1, wherein the spiral coils each have an increased layer thickness in a region of their ends, and/or end pieces are attached to the ends of the spiral coils.

8. The torsion carrier as claimed in claim 1, wherein the spiral coils each have a reduced width in a region of their ends and said spiral coils thus have an increased deformation capability in an event of bending in a circumferential plane.

9. The torsion carrier as claimed in claim 1, wherein the at least two layers include at least two layers of spiral coils separated from one another by at least one elastic intermediate layer.

10. The torsion carrier as claimed in claim 1, wherein the at least two layers include at least two layers having different spiral coil orientations spaced by at least one elastic intermediate layer.

11. The torsion carrier as claimed in claim 1, wherein a core increasing the flexural rigidity or transverse force load-bearing capability is arranged radially on an inside of the at least two layers of spiral coils.

12. The torsion carrier as claimed in claim 1, wherein inside and/or outside diameters of the torsion carrier are configured to change along a length of the torsion carrier.

13. The torsion carrier as claimed in claim 1, wherein a tube including the at least two layers of spiral coils or a round bar including the at least two layers of spiral coils has an external form of a screw.

14. A torsion tube spring, a torsion bar, a flexurally elastic torsion shaft, a drive shaft or a helical spring includes the torsion carrier as claimed in claim 1.

15. The torsion carrier as claimed in claim 1, wherein each spiral coil extends longitudinally from a first end to a second end such that the at least two discrete spiral coils are disposed in parallel relationship from the first ends of the respective at least two discrete spiral coils to the respective second ends of the respective at least two discrete spiral coils.

16. The torsion carrier of claim 1, wherein the at least one spiral coil has a rectangular configuration when viewed in cross-section.

17. The torsion carrier of claim 1, wherein each of the first surface and the second surface has at least one of a convex shape or a concave shape that conforms to a contact surface of the at least one spacing elastic intermediate layer.

18. The torsion carrier of claim 1, wherein the at least one spacing elastic intermediate layer has a constant thickness so that an arrangement of the at least one spiral coil of the first layer of the at least two layers and the at least one spiral coil of the second layer of the at least two layers relative to the at least one spacing elastic intermediate layer provides a hydrostatic pressure or tension in the at least one spacing elastic intermediate layer when a radial force or a tensile force is applied between the at least one spiral coil of the first layer and the at least one spiral coil of the second layer.

19. The torsion carrier of claim 18, wherein the at least one spacing elastic intermediate layer has an outer surface in contact with the at least one spiral coil of the first layer and an inner surface in contact with the at least one spiral coil of the second layer, and wherein the inner surface of the at least one spacing elastic intermediate layer is radially offset from the outer surface of the at least one spacing elastic intermediate layer.

20. The torsion carrier of claim 19, wherein the at least one spiral coil of the first layer has a different cross-sectional configuration than the at least one spiral coil of the second layer.

* * * * *